May 14, 1963
G. J. PIKE
3,089,486
ORTHOPEDIC STRUCTURES, AND METHODS AND COMPOSITIONS FOR MAKING SAME
Filed March 29, 1961
3 Sheets-Sheet 1
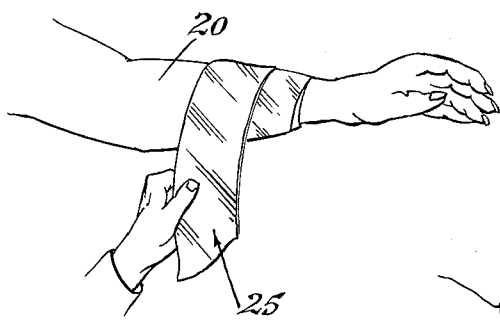
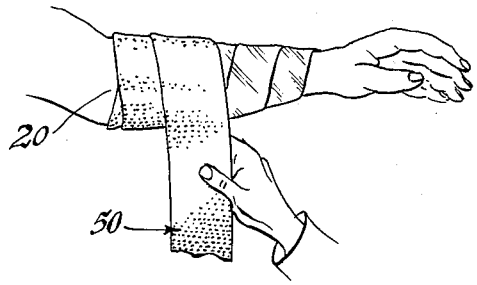
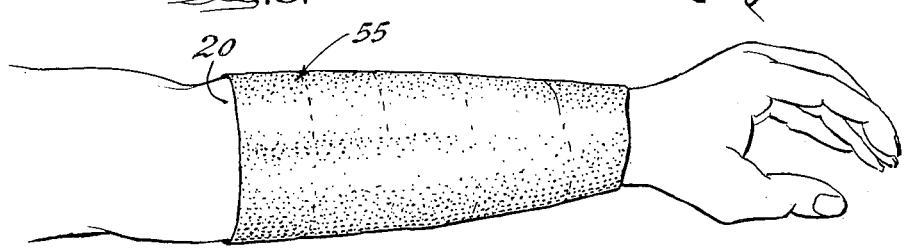
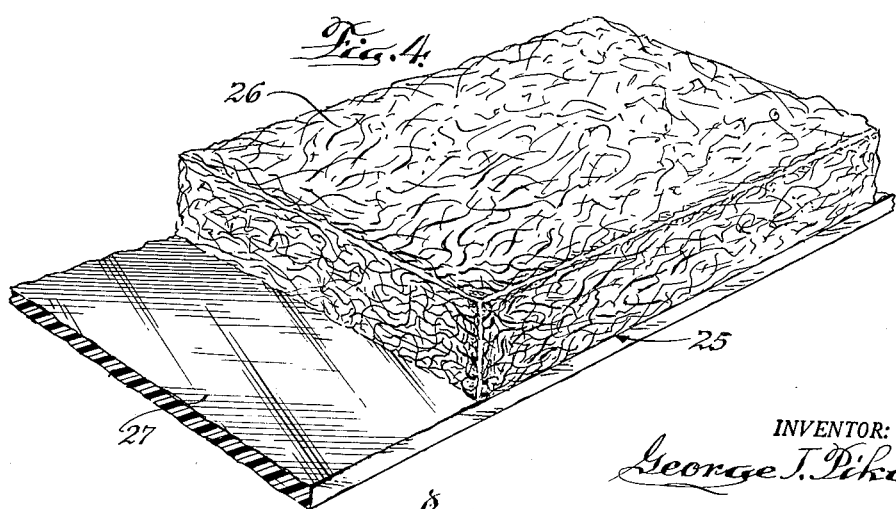
INVENTOR:
George J. Pike
By Muriam, Smith & Marshall
Attorneys.

May 14, 1963
G. J. PIKE
3,089,486
ORTHOPEDIC STRUCTURES, AND METHODS AND COMPOSITIONS FOR MAKING SAME
Filed March 29, 1961
3 Sheets-Sheet 2
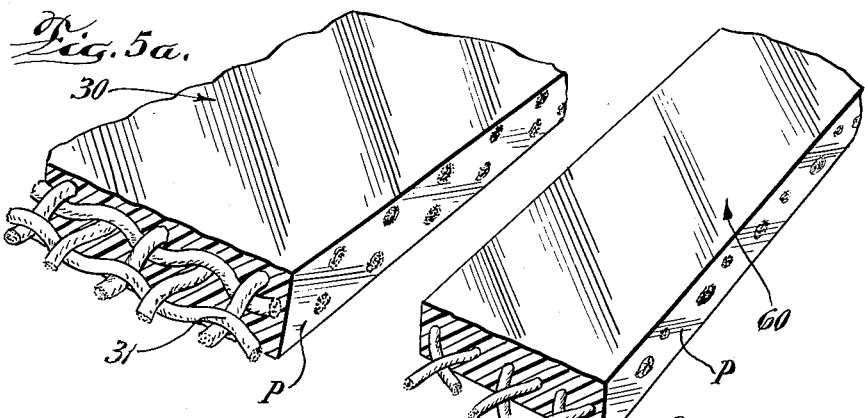
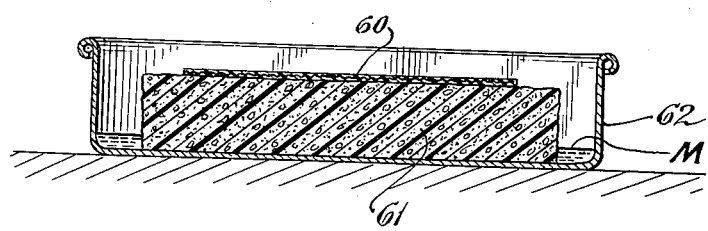
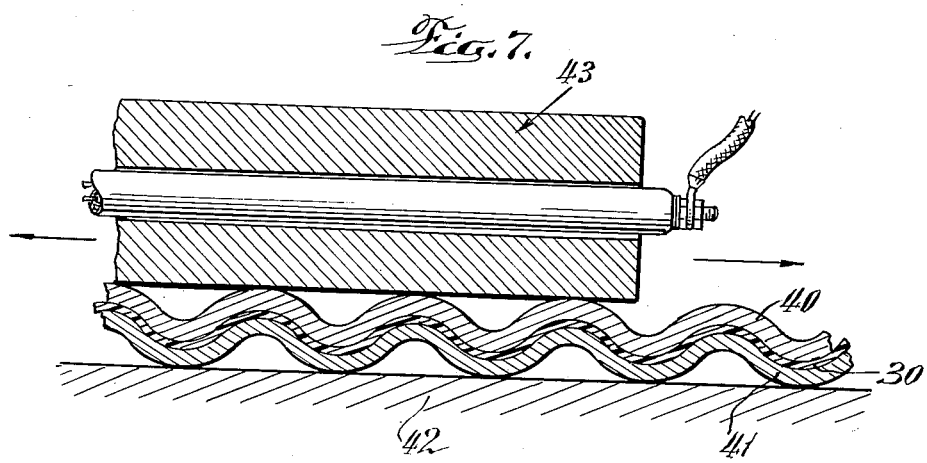
INVENTOR:
George J. Pike
By Merriam, Smith & Marshall
Attorneys

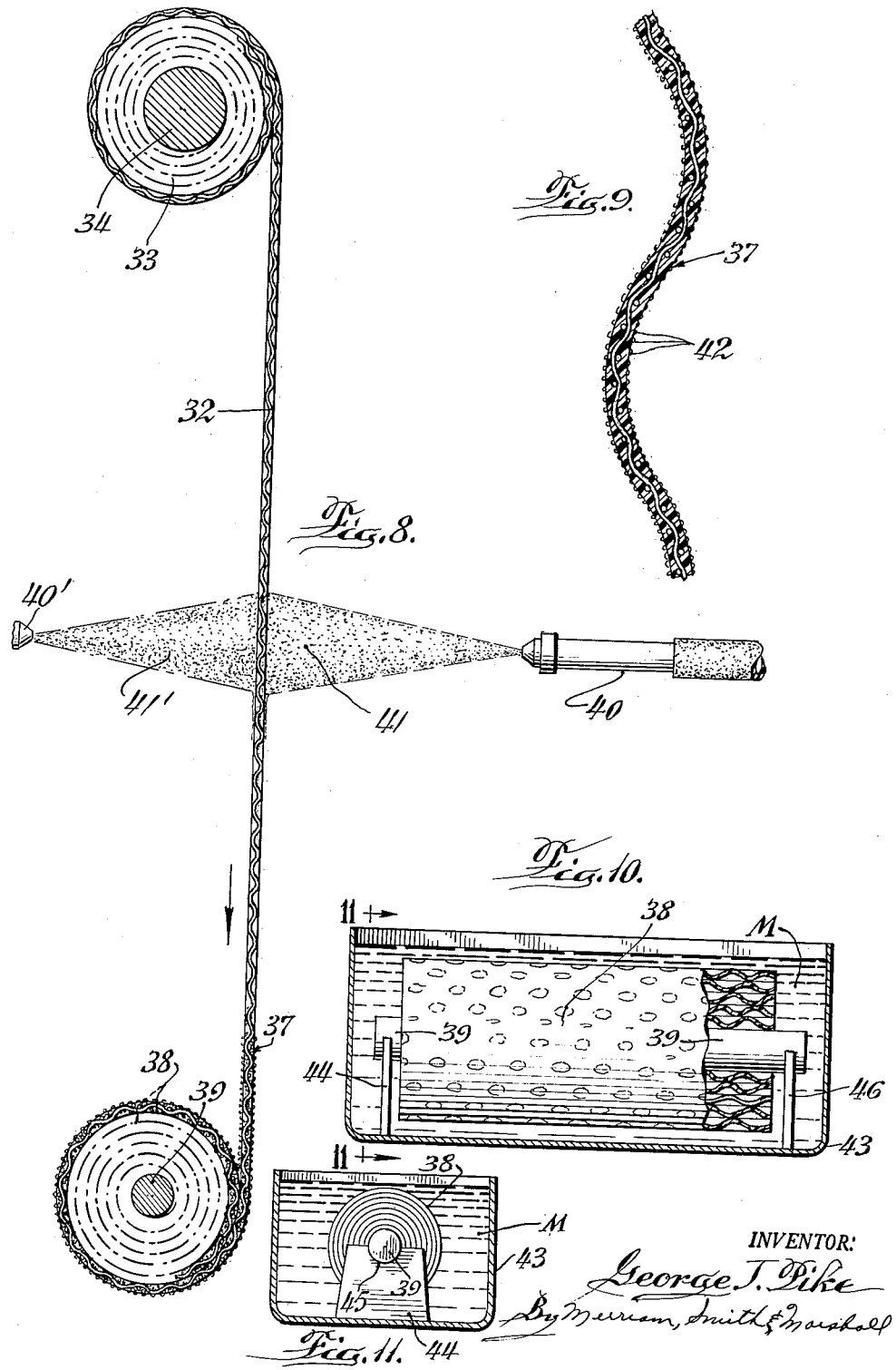

United States Patent Office 3,089,486
Patented May 14, 1963

3,089,486
ORTHOPEDIC STRUCTURES, AND METHODS AND COMPOSITIONS FOR MAKING SAME
George J. Pike, Box 139, Fife Lake, Mich.
Filed Mar. 29, 1961, Ser. No. 99,316
20 Claims. (Cl. 128—90)

This invention relates to hard, rigid orthopedic structures for animals, including humans, various constituents used in making said appliances and structures, and methods for making said appliances and structures.

The terms "immobilizing orthopedic structure" and "immobilizing structure" are sometimes herein used to include casts, splints, and the like, for body members. The term "orthopedic appliances" is sometimes herein used to include corsets, braces, artificial limbs, arch supports, and the like, for body members. The term "orthopedic structures" is sometimes herein used to refer to "immobilizing orthopedic structures" as well as "orthopedic appliances."

The term "imbued" is sometimes herein intended to include a flexible bandage that is uniformly impregnated and coated with a controllable amount of a methacrylate polymer component that remains firmly affixed thereto.

Although plaster of Paris has long been used in forming immobilizing orthopedic structures and the like, such as casts, it has many undesirable characteristics which have led others to seek a substitute for this material.

For example, in forming a plaster cast on the body, the bandage is wetted which, in turn, subjects the body member to moisture which tends to irritate the skin. The skin is constantly subjected to such moisture even though the surface of the cast is desiccated (which generally does not occur until after many hours) and the entire structure is thought to be dry. Further, the water used in making the orthopedic structure is not the only source of moisture; body perspiration, for example, causes the interior surface of the plaster cast to be continuously moist, thereby inducing skin irritation and producing a putrid odor. Further, plaster casts deteriorate when wetted, are difficult to keep clean, and cannot be applied without considerable mess. In addition, orthopedic structures made of plaster are very heavy and burdensome. Still further, although the plaster cast may be removed, if the body member should swell or shrink, the cast cannot be reused and must be replaced by forming an entirely new one.

Despite efforts to replace plaster of Paris, none of the presently available substitutes have proven entirely satisfactory.

My invention affords an excellent replacement for plaster of Paris, and provides for the formation of orthopedic structures that: (1) may be readily formed without necessitating the application of elevated temperatures or causing the formation of hazardous heat; (2) do not have a harmful effect on the body; (3) are very light weight (e.g., about one-fourth the weight of plaster of Paris); (4) have high structural strength (e.g., about four times greater than plaster of Paris); (5) are impervious to water, body fluids, alcohol, detergents, and the like; (6) have excellent X-ray transmitting properties; (7) may be removed from the body member or form and re-applied, with modification, to the body member; (8) may be perforated to form a comfortable, ventilated orthopedic structure; (9) do not require as many wrappings or laminae as heretofore used in applying a bandage having plaster of Paris; and (10) unlike plaster of Paris, do not permanently entrap moisture against the skin or cause skin irritation.

My invention also includes methods of preparing a hard immobilizing orthopedic structure for a body member comprising: applying a flexible protective barrier to the body member, then applying a flexible bandage imbued with a uniformly distributed, controllable amount of methacrylate polymer component affixed thereto and freshly impregnated with a controllable amount of liquid, curable, methacrylate monomer component, to provide a bandage having a monomer reaction system (e.g., monomer, promoter and catalyst) that rapidly and uniformly cures (i.e., polymerizes) and intimately fuses with said polymer component at ambient temperatures and forms a hard, rigid immobilizing structure of desired thickness and structural strength without necessitating the application of heat thereto and without producing high, body-irritating temperatures; said methacrylate polymer component containing plasticized methacrylate polymer having a polymerization catalyst; and said curable monomer component containing methacrylate monomer and polymerization activator (e.g., promoter).

The same procedure may be followed in making my orthopedic appliances. However, in making appliances, the monomer-treated, polymer-imbued bandage may be applied to an actual or simulated body member or form and the protective barrier may be replaced by a hard oil-impregnated bandage or barrier (of any desired size or shape) that has been applied to the actual or simulated body member or form (prior to the application of the curable bandage). This oil-treated bandage provides means for readily releasing the curable, monomer-treated, imbued bandage after it has been form-molded or form-fitted to the desired shape and it has at least started to harden. The hard oil may be a mineral oil having a melting point of at least 130° F., such as Stanolined Petroleum Snow White Oil.

Best results are obtained when preparing orthopedic structures by applying the monomer component to flexible polymer-imbued bandage and then applying the resulting monomer-treated bandage over the body member or form; however, if desired, the flexible imbued bandage may be first placed on the body member or form and the bandage may then be treated with the monomer component, although this procedure is distinctly inferior to treating the imbued bandage with monomer before applying it to the body member or form.

If desired, curing or polymerization may be accelerated by applying heat to the monomer-treated, polymer-imbued bandage with an infra-red element. This element should be controlled with a rheostat, so as to limit its projected heat to a maximum temperature of about 80° F.

If desired, the hard orthopedic structure may be then removed (e.g., cut) from the body member and freed of the protective barrier. The size of the removed structure may be then readily modified to compensate for shrinkage or swelling of the body member, and the modified structure applied or secured to the body member by bonding the separated edges of the structure together by applying a curable, monomer-treated, polymer-imbued bandage thereto. In addition, a protective layer or cushion of soft, pliable material (e.g., moleskin or polyurethane foam) may be secured to the interior surface of the removed structure; the structure may be then ventilated by forming holes therein. The cushioned and/or ventilated orthopedic structure may be replaced over the body member in the desired manner, to form a rigid protective structure, and the sections secured to each other by applying a curable, monomer-treated, polymer-imbued bandage along the seams formed by abutting edges of the orthopedic structure.

It is acknowledged that attempts have been made in the past to produce immobilizing orthopedic structures by the use of synthetic resinous systems such as methacrylate polymer and methacrylate monomer. However, these past procedures have not been acceptable.

In one such suggested prior art procedure, a mixture of polymer and peroxide are applied to fabric, after which methacrylate monomer is applied to the imbued fabric. The imbued bandage used in this procedure, unlike my flexible imbued bandage, is hard and non-flexible. Further, the high amount of polymer that is applied to the bandage prevents the imbued bandage from rapidly and evenly curing when the monomer is applied thereto. Still further, when the monomer is applied to the imbued bandage, the polymer has a tendency to slough-off the fabric, the amount of monomer that should be applied may not be readily determined, and the polymerization is not readily controlled.

On the other hand, my flexible polymer-imbued bandage permits an easily determined amount of monomer component to be applied to the imbued bandage, and the resulting polymerization system remains uniformly distributed on the bandage and cures rapidly and evenly at relatively low temperatures.

In the accompanying diagrammtical drawings, wherein various methods of producing an immobilizing orthopedic structure are shown:

FIGURE 1 is a front elevational view showing the wrapping of a flexible, protective barrier bandage in a counter-clockwise direction about an injured arm member so that the bandage overlaps the preceding wrapping about one-half the width of the bandage;

FIGURE 2 is a front elevational view similar to FIGURE 1 showing an embossed or pebbled polymer-imbued bandage that has been impregnated with methacrylate monomer component by immersion therein being wrapped by the "roll-on" method in a clockwise direction directly over the protective barrier bandage and underlying arm, so that each turn of the monomer-treated, polymer-imbued bandage overlaps a portion of the width of the wrapping or turn which precedes it;

FIGURE 3 is a front elevational view similar to those shown in FIGURES 1 and 2 showing the cured, immobilizing orthopedic structure produced as a result of the step shown in FIGURE 2;

FIGURE 4 is an enlarged, partial sectional, prospectve view of the protective barrier bandage showing a portion of the barrier removed for illustrative purposes;

FIGURE 5a is an enlarged, fragmentary, partial sectional, prospective view of a polymer-imbued fabric bandage, with part of the polymer component removed from the fabric for illustrative purposes, showing the structure of the bandage before it is embossed, treated with release agent, impregnated with monomer compor.ent, and applied to the body member by the "roll-on" method;

FIGURE 5b is an enlarged, fragmentary, partial sectional, prospective view, similar to FIGURE 5a, showing the structure of a polymer-imbued fabric bandage, including the weave of the fabric, before it is impregnated with the monomer component and applied to the body member by the "laid-on" method; the fabric shown in this figure differs from that shown in FIGURE 5a in that the fabric of FIGURE 5b has been cut on the bias instead of with the weave;

FIGURE 6 is a front elevational, sectional view of a strip of polymer-imbued bandage of FIGURE 5b being impregnated with liquid monomer component by being placed upon a non-reacting plastic sponge that is saturated with monomer component;

FIGURE 7 shows one of the steps, an embossing step, used in preparing the polymer-imbued bandage shown in FIGURE 5a for immersion in the liquid monomer component;

FIGURE 8 is a sectional elevational view showing the spraying of "liquefied" beeswax on both sides of the embossed polymer-imbued bandage produced in the step shown in FIGURE 7;

FIGURE 9 is an enlarged, sectional view showing a portion of the beeswax-coated, embossed, polymer-imbued bandage produced by the coating step shown in FIGURE 8;

FIGURE 10 is an elevational view, with a section removed, showing impregnating a roll of beeswax-coated, embossed, polymer-imbued bandage, produced by the coating step shown in FIGURE 8, with monomer component by suspending the roll in a container having liquid monomer component therein; and FIGURE 11 is a front elevational, sectional view along the line 11—11 shown in FIGURE 10.

As the first step in forming the immobilizing structure, a protective barrier bandage is applied to the injured body member that is to be later covered with monomer-impregnated, polymer-imbued bandage, in order to protect the member from skin irritating fumes and/or seepage from the monomer component.

FIGURE 4 shows a protective barrier bandage 25 comprising a film of polyethylene 27 heat-bonded along its side marginal edges to an unwoven strip of cotton bandage 26.

In applying the protective barrier 25 to the injured arm 20 in the manner shown in FIGURE 1, the barrier is wrapped about the arm (if desired, the arm may be first covered with a stockinette) in a counter-clockwise direction with the cotton bandage portion 26 placed against the arm 20, so that each turn of the bandage overlaps the preceding wrapping about one-half the width of the bandage. Then, either a continuous roll of monomer-treated, polymer-imbued bandage 50 that has been embossed or comparatively short strips of monomer-treated, polymer-imbued bandage that has not been embossed may be wrapped over the outer polyethylene film portion of the protective barrier 25. In view of the slippery surface of the polyethylene film 27, an ordinary surgical gauze bandage (not shown) may be, if desired, first wrapped about the barrier before applying either of these types of the monomer-impregnated, polymer-imbued bandages.

In applying a monomer-treated, embossed polymer-imbued bandage 50 about 3½ inches wide to the arm 20, the bandage 50 is initially wrapped by a "roll-on" procedure in a clockwise direction twice about the barrier-protected arm without advancing or partially overlapping the bandage. The bandage 50 is then wrapped, as shown in FIGURE 2, in an advancing (advancing about 1 inch per turn) overlapping manner about the barrier sheath, so that each turn overlaps about 2½ inches of the wrapping or turn that precedes it. The wrapping of the monomer-treated, embossed polymer-imbued bandage is completed in the same manner in which it is started; that is, it is completed by wrapping two turns of the bandage directly upon itself.

The short strips of monomer-treated, polymer-imbued bandage may be "laid-on" or applied to the arm in a manner similar to that described above with respect to the roll of embossed bandage, except that separate strips are used rather than a continuous roll. Although the roll is better suited for forming the particular type of immobilizing orthopedic structure shown in the drawings, the strips are particularly well suited for being modeled or molded to a desired shape or formed into orthopedic structures such as airplane splints.

Both the continuous wrapping of monomer-treated, embossed polymer-imbued bandage and separate strips of monomer-treated, polymer-imbued bandage cure or harden at room temperature in a short period of time (e.g., about 7–9 minutes) to form an integral, hard, rigid, resinous immobilizing sheath that is light in weight, remains strong, and is non-irritating to the skin.

FIGURE 3 shows the cured, immobilizing orthopedic structure 55 that is produced when a continuous roll of monomer-treated, embossed polymer-imbued bandage 50, such as shown in FIGURE 2, is used. It should be noted that the side marginal edges of the bandage 50 shown in FIGURE 2 essentially disappear from sight upon curing of the monomer-polymer system.

FIGURE 5a shows the structure of a polymer-imbued cotton crinoline bandage 30 before it is embossed, coated with a release agent, and impregnated with the liquid monomer component for the "roll-on" method. FIGURE 5b shows the structure of a polymer-imbued, cotton tarlatane bandage 60 before it is impregnated with the same monomer component and applied to the body member by the "laid-on" method. The structure of these two types of polymer-imbued bandages are very similar (for example, each of bandages 30 and 50 may have about 0.2 gram of polymer component P per in.$^2$ of fabric); however, the weave of the fabrics differ. The tarlatane fabric 61 shown in FIGURE 5b has been cut on the bias to give the bandage excellent stretching properties, thereby enabling one to more readily "form-fit" the monomer-treated bandage to the contour of the body member. On the other hand, the crinoline fabric 31 shown in FIGURE 5a has been cut with the weave, which permits the user to apply tension to the monomer-treated, polymer-imbued bandage without disturbing the controlled distribution and securement of polymer component.

In preparing the monomer-treated, embossed bandage shown in FIGURE 2, a roll of polymer-imbued bandage 30 of the type shown in FIGURE 5a is embossed, coated with a release agent, and immersed in the monomer component.

The embossing step enables the monomer component to uniformly and thoroughly impregnate or saturate each turn of the bandage in the roll when the roll is immersed therein. This embossing step may be carried out by applying a heating element, such as an ordinary household laundry iron, to the uppermost member of a composite assembly comprising a strip of polymer-imbued bandage sandwiched between two sheets of complementing, embossed metal patterns. For example, as shown in FIGURE 7, an assembly comprising a strip of polymer-imbued bandage 30 positioned between two identically embossed or dimpled, complementing aluminum sheets 40 and 41 (e.g., Pattern M209 Polygon, a product of Reynolds Aluminum Company), may be placed upon a supporting surface 42. A heated plate element 43 at a temperature of about 550° F. is then maintained in a fixed position on the upper aluminum pattern 40 for about 45 seconds, and then moved along the pattern 40, in a step-wise manner, until the entire length of bandage has been subjected to this heat treatment. The embossed bandage 32 may then be removed from between the patterns.

A release agent such as beeswax is then applied to both surfaces of the bandage, and the bandage is coiled into a roll. FIGURE 8 shows a roll 33 of embossed bandage 32 being continuously fed from an upper tubular core 34 to a second tubular core 39 that is spaced from the first roll 33 but in parallel relationship thereto. Nozzles 40 and 40' spray a light coating of "liquefied" beeswax 41 and 41', respectively, onto both sides of bandage 32 as it advances to the second roll 38. Excellent results have been obtained by spraying a fluid admixture 41 of 8 parts by weight beeswax and 214 parts by weight chloroform, so that about 0.9 gram of beeswax remains on about a 350 in.$^2$ surface of the embossed bandage after the chloroform evaporates. Evaporation of the chloroform may be hastened by blowing air on the sprayed bandage.

FIGURE 9 is an enlarged view of the bandage 37 showing solid particles of beeswax 42 on both surfaces of the embossed bandage.

The roll 38 of the beeswax-coated embossed bandage 37 is then impregnated with the liquid monomer component M by being immersed therein. For example, as shown in FIGURES 10 and 11, the roll 38 may be suspended in a tray 43 containing the liquid monomer component M by placing the outer free ends of the core 39 in the U-shaped slots at the upper end of each of the supporting arms 44 and 46. FIGURE 11 shows an end of the core 39 resting in slot 45 of arm 44. When the polymer-imbued bandage has about 0.200 gram of polymer component per square inch of bandage, the beeswax-coated embossed bandage should be immersed in the monomer component M for about ½–2 minutes.

The roll of monomer-treated polymer-imbued bandage 50 is ready for use immediately after being removed from the monomer bath.

Strips of the bandage 60 shown in FIGURE 5b may be impregnated with the monomer component in the manner shown in FIGURE 6. This method involves placing a Polyfoam (cellular polyurethane product of General Tire & Rubber Company) sponge about 3/16 inch thick in a tray 62, saturating the entire sponge with the liquid monomer component M, and laying one side of the bandage 60 on the saturated sponge 61 to thoroughly impregnate the entire bandage 60. This method of impregnating the bandage 60 enables one to conveniently apply a readily controlled and uniform level of the monomer component to the polymer-imbued bandage and, at the same time, thoroughly moistens the imbued bandage with the monomer component. The moistened, polymer-imbued bandage may then be directly applied over the protective barrier (not shown) by placing, by the "laid-on" method, the individual strips of the bandage over the arm by (moderately) pulling or forming the bandage as it is placed on the arm.

PROTECTIVE BARRIER

A satisfactory flexible protective barrier may be prepared by placing, in overlying position, a strip of polyethylene film not less than 1 mil thick upon a sheet of ordinary aluminum foil of the type used for household purposes, a strip of unwoven cotton Curity Webrill Bandage (product of Bauer & Black Division of the Kendall Company) upon the polyethylene, and, finally, a strip of aluminum foil upon the cotton bandage. Heat is then applied, under controlled conditions, to the upper aluminum foil directly over the side marginal portions of the underlying fabric and polyethylene strips, so that the strips become heat-bonded to each other along their marginal edges. For example, an ordinary laundry iron at 400° F. may be placed with moderate pressure upon the upper aluminum foil and progressively moved by hand a distance about equal to the width of the iron during about a 5 second period.

The protective barrier may be formed into a pre-formed tubular sheath.

POLYMER-IMBUED BANDAGE

The polymer component-imbued bandage, such as bandages 30 and 60 shown in FIGURES 5a and 5b, respectively, may be formed by impregnating and coating (i.e., saturating) both sides of a fibrous bandage with a controlled amount of methacrylate polymer impregnant, and permitting the volatile contents of the impregnant to volatilize therefrom to provide a flexible imbued bandage having good shelf life and a controlled amount of methacrylate polymer component firmly and uniformly affixed to the fabric.

The methacrylate polymer impregnant contains finely divided methacrylate polymer particles, honey, water (e.g., distilled water), a secondary plasticizer, and thickener and flow control agent. The impregnant must be capable of being uniformly applied (e.g., by a brushing or spraying operation, or by dipping the fibrous bandage in a bath) to a fibrous bandage so as to impregnate as well as coat the bandage. After the volatile liquids have volatilized from the impregnant, the resulting solid methacrylate polymer component (1) becomes permanently affixed to the fabric and does not tend to flake-off, (2) enables the imbued bandage to be rolled upon itself and readily unrolled without disturbing or destroying its uniform distribution on the fabric, (3) permits the imbued bandage to have substantially permanent shelf life when properly sealed (e.g., wrapped in aluminum paper) from the air, (4) enables the imbued bandage to possess flexible and, if desired, stretchable characteristics, (5) permits the curable methacrylate monomer component to cure or polymerize in contact therewith at room temperatures or moderately elevated temperatures in a short period of time (e.g., about 7–9 minutes) without subjecting the covered body member to hazardous or uncomfortable elevated reaction temperatures, and (6) is fused to the methacrylate monomer component after the latter is cured.

The methacrylate polymer (i.e., the polymeric ingredient of the methacrylate polymer component) comprises finely divided polymer particles produced by polymerizing a lower alkyl methacrylate monomer, such as methyl or ethyl methacrylate, in an aqueous suspension in the presence of a catalyst, such as benzoyl peroxide, and desired plasticizer. The polymer must be capable of making available the catalyst to the monomer component when the latter is applied to the imbued bandage. In addition, the polymer must fuse with the monomer component during the curing (i.e., polymerizing) of the monomer component. The polymer may be prepared by the aqueous suspension polymerization of a mixture of (1) 15% plasticizer such as dibutyl phthalate or methyl ethyl glycolate, (2) 1% peroxide polymerization catalyst (e.g., benzoyl peroxide) and (3) 84% methyl and/or ethyl methacrylate in the presence of sufficient protective colloid to form fine pearls and avoid agglomeration. The suspension polymerization may be conducted in accordance with the general procedure set forth in pages 211–214 of "Vinyl and Related Polymers," by C. E. Schildknecht, published by John Wiley & Sons, Inc., N.Y. (1952). Excellent results are obtained with Type 1, Superfine, Fast Polymerizing Acrylic Polymer (a substantially completely polymerized product containing about 84% methyl methacrylate, about 1% benzoyl peroxide, and about 15% phthalyl glycollate), produced by Sartomer Resins, Inc., Philadelphia, Pa.

The non-polymeric ingredients of the methacrylate polymer component tend to lower the very high reaction temperature which would normally be produced when the curable methacrylate monomer component intimately contacts the methacrylate polymer and, at the same time, permit the polymer to make the catalyst available to the monomer component so that the latter may rapidly cure at room temperatures or moderately elevated temperatures and fuses with the polymer component to produce a hard, rigid orthopedic structure.

Honey, such as non-crystallizing tupelo honey, is an essential constituent of the impregnant. It serves as the primary plasticizer in the polymer component, enables the monomer component to cure or polymerize rapidly, in contact with the polymer component, at room temperature, lends flexibility to the polymer-imbued bandage, gives the imbued bandage good shelf life, and assists in enabling the liquid impregnant and the solid polymer component produced from the impregnant to adhere to the fabric.

A secondary plasticizer should be used in the impregnant in conjunction with honey, to stabilize the honey (e.g., tupelo honey) against crystallization and assure enduring flexibility and shelf life. Satisfactory results have been obtained with G-2401 Non-Crystallizing Polyol (distributed by Atlas Powder Co., Wilmington, Del.), an emulsifier that acts as a plasticizer and humectant. The G-2401 product is produced by reacting one mole of propylene oxide with one mole of sorbitol under pressure, and is a 85% aqueous solution of hydroxylpropyl sorbitol, a non-crystallizing, light-straw colored liquid of high viscosity (about 3500 cp. at room temperature).

A "bodying" agent or thickener and flow control agent should also be used with the impregnant, thereby facilitating the application and retention of a uniform and controlled amount of impregnant and polymer component on the fabric bandage. The thickener-flow control agent may include or consist of a polyester resin, with or without a pigment ground in the resin, and a non-reactive volatile solvent such as acetone. The polyester resin may be an unsaturated polyester concentrate made by the esterification of a lower alkyl unsaturated dicarboxylic acid, such as itaconic acid or maleic acid, and a long-chain saturated dicarboxylic acid, such as adipic acid and sebacic acid, with a lower alkylene glycol, such as ethylene glycol, diethylene glycol, and propylene glycol. For example, one may use an admixture of acetone, and an unsaturated polyester concentrate, such as described above, having about 40% by weight pigment (e.g., titanium dioxide) ground therein, such as Selectron Paste Concentrate 5521, a product of Pittsburgh Plate Glass Co. This Selectron product is believed to also have some plasticizing properties.

Table I, below, shows two suitable lower alkyl methacrylate polymer impregnants; however, the formulation designated as composition "A" is the preferred one.

*Table I*

COMPOSITIONS OF IMPREGNANTS

| Ingredients of Impregnant | Composition "A" | | Composition "B" | |
|---|---|---|---|---|
| | Parts by Weight | Percent by Weight | Parts by Weight | Percent by Weight |
| Type 1, Superfine, Fast Polymerizing Acrylic Polymer | 62.2 | 49.6 | 108 | 46.6 |
| Honey (i.e., tupelo honey) | 9.5 | 7.6 | 23 | 9.9 |
| G-2401 Non-Crystallizing Polyol | 6.8 | 5.4 | 16 | 6.9 |
| Water (i.e., distilled water) | 43.5 | 34.6 | 73 | 31.4 |
| Selectron Paste Concentrate 5521 | 1.0 | .8 | 6 | 2.6 |
| Acetone | 2.5 | 2.0 | 6 | 2.6 |

The impregnant illustrated in Table I may be prepared by first admixing the tupelo honey, G-2401 Non-Crystallizing Polyol, and water, and then thoroughly admixing the Type 1, Superfine, Fast Polymerizing Acrylic Polymer therein to form a polymer mix. The acetone may be added to and mixed with Selectron Paste Concentrate 5521, and the resulting admixture added to and mixed with said polymer mix to form the methacrylate polymer impregnant.

The proportions of ingredients shown in Table I, especially the water, may be varied, to some degree, in accordance with personal preference of the user. It should be noted, however, that the viscosity of the methacrylate polymer impregnant must enable one to thoroughly and uniformly impregnate the fabric bandage to which it is applied to form an imbued bandage having the proper predetermined amount of dry polymer component firmly affixed to the bandage.

Care should be used in selecting the percentage of tupelo honey present in the impregnant. Excess honey tends to cause the polymer component to become unduly viscous and moist; further, the wetting of the bandage with the monomer component will cause the resulting reaction mixture to flow or slough-off, thereby destroying the uniform and controlled distribution of the polymer component that is affixed to the fabric bandage. If less than the proper amount of honey is used, the polymer-imbued bandage will not be sufficiently flexible and will have unsatisfactory shelf life. As the amount of honey is adjusted, the levels of the other constituents used should likewise be changed proportionally. I have found that excellent results are obtained when about 12–21 parts by weight of tupelo honey are used for each 100 parts by weight of the Type 1, Superfine, Fast Polymerizing Acrylic Polymer.

The methacrylate polymer impregnant shown in Table I may be brushed on one side of an untreated fabric bandage made of No. 950 tarlatane (a combed cotton yarn of 28/24 construction which is bleached and starch-filled, manufactured by Narwood Brothers, New York, N.Y.), or cotton crinoline, although a variety of other fabrics may be used. These fabrics have satisfactory tensile strength properties and their open weave permits the bandage to be placed on wax paper and the polymer impregnant to be brushed on one side thereof and pass through its interstices to coat both its sides.

The tarlatane fabric, which is particularly well suited for the "laid-on" method, should be cut into bandages on the bias in order to permit the imbued bandage to possess two-way stretch. On the other hand, cotton crinoline may be cut with the weave in preparing polymer-imbued bandages for use in the "roll-on" method of application.

Excellent results are obtained when the amount of impregnant applied to the bandage provides (following evaporation of the volatiles) an imbued bandage that retains about 0.20–0.25 gram of the methacrylate polymer per square inch of fabric; the polymer will of course be present on the fabric in conjunction with the other non-volatile ingredients of the polymer component.

When the impregnant is applied to fabrics which differ from the aforesaid types of fabrics, the proportions of ingredients specified in Table I may require modification in order to enable the imbued bandage to contain the desired amount of methacrylate polymer content per square inch of fabric.

After the impregnants shown in Table I, above, have been applied to the bandage and the volatile liquids (i.e., water and acetone) have evaporated, the resulting polymer components (about 0.20–0.25 gram per square inch) will have the compositions shown in Table II, below.

*Table II*

COMPOSITION OF POLYMER COMPONENTS PRODUCED FROM IMPREGNANTS SHOWN IN TABLE I

| Ingredients of Polymer Components | Polymer Component from Composition "A," Percent by Weight [1] | Polymer Component from Composition "B," Percent by Weight [1] |
|---|---|---|
| Type 1, Superfine, Fast Polymerizing Acrylic Polymer | 78.2 | 70.8 |
| Honey (i.e., tupelo honey) | 12.0 | 15.6 |
| G-2401 Non-Crystallizing Polyol | 8.5 | 9.7 |
| Selectron Paste Concentrate 5521 | 1.3 | 3.9 |

[1] Based on the entire polymer component.

CURABLE METHACRYLATE MONOMER COMPONENT

The liquid, curable methacrylate monomer component, such as used in the procedures shown in FIGURES 6 and 10, contains a curable methacrylate monomer and a polymerization activator, such as an amine polymerization promoter (e.g., tertiary aryl amine). The tertiary amine promoter (e.g., dimethyl aniline and dimethyl p-toluidine) causes the polymerization catalyst (e.g., peroxidic catalyst) present in the methacrylate polymer to release free radicals and to initiate curing (i.e., polymerization) of the monomer component at temperatures much lower than otherwise required.

Thus, when the monomer component is applied to the imbued bandage, the monomer component penetrates the partially solubilized polymer component and the catalyst present in the polymer intimately contacts the monomer component causing the latter to undergo autocatalytic curing and fusion with the polymer component.

Since the curable, lower alkyl methacrylate monomer component normally polymerizes at temperatures of about 200° F., it is certainly unexpected, and one of the outstanding features of my invention, that the monomer component polymerizes at much lower temperatures—temperatures which do not cause discomfort to the body member being immobilized—in contact with the polymer-imbued bandage.

A suitable methacrylate monomer component may be prepared by admixing about 0.5–2% dimethyl aniline with 98–99.5% methyl methacrylate monomer. Fast Polymerizing Methacrylate Monomer (96.6% methyl methacrylate and 0.4% dimethyl p-toluidine), produced by Sartomer Resins, Inc., Philadelphia, Pa., has been found to be an excellent methacrylate monomer component.

The highly volatile nature and toxic and irritating fumes normally associated with curable methacrylate monomer components produce an undesirable physical as well as psychological respiratory reaction upon those exposed to it. I have, quite unexpectedly, reduced the vapor pressure and overcome this undesired pungent odor by treating the curable methacrylate monomer component (i.e., Fast Polymerizing Methacrylate Monomer) with a soap composition. This treatment may be carried out by first dissolving a one-half pound bar of ordinary non-perfumed laundry soap (e.g., Fels-Naphtha, a product of Fels & Co.) in a one-half gallon of heated distilled water, and then, adding 1 part by volume of soap solution to 4 parts by volume of the curable methacrylate monomer component with continuous and vigorous agitation for about 10 minutes. After the soap solution phase has settled (which may take 3–10 days) from the monomer component phase, the curable methacrylate monomer component may be removed therefrom and is ready for use.

This soap treatment decreases the vapor pressure of the methacrylate monomer component, which appears to indicate that the soap solution has either extracted a constituent or substituent from the monomer component or reacted or combined with such constituent or substituent.

The data shown in Table III were obtained during the formation of casts made on body members with monomer-treated, polymer-imbued bandages that were applied by the "roll-on" and "laid-on" methods.

The first column in the table shows the number of laminae of monomer-treated, polymer-imbued bandage that were applied in making each of the casts. The second column indicates the level of polymer component, produced from composition "A" shown in Table I, above, that is affixed to each square inch of the fabric. The third column shows the room temperature. Column four shows the maximum reaction temperature that was produced at the body from the monomer curing or polymerizing in contact with the polymer component. The fifth column in the table shows the time required to form a hard or cured cast, after either applying a roll of the monomer-treated, polymer-imbued bandage to the body member by the "roll-on" method or placing strips of the monomer-treated, polymer-imbued bandage on the body member by the "laid-on" method. The last column indicates whether the "roll-on" method application was followed, or whether the "laid-on" method was used.

Table III
IMMOBILIZING ORTHOPEDIC STRUCTURES FORMED ON A BODY MEMBER

| Nos. of Laminae of Monomer-Treated, Polymer-Imbued Bandage | Polymer Component From Composition "A" (Grams Affixed to Each Square Inch of Bandage), Grams | Room Temperature, °F. | Max. Temp.[1] of Reaction After Monomer Component is Applied to the Imbued Bandage, °F. | Time Required to Form a Hard Immobilizing Structure, Minutes | Method of Application of Monomer Component to Imbued Bandage and Application of Monomer-Treated, Imbued-Bandage to Body Member |
|---|---|---|---|---|---|
| 3 | .20 | 80 | 108 | 12 | "Roll-on."[2] |
| 3 | .214 | 79 | 105 | 10 | Do. |
| 4 | .220 | 82 | 107 | 10 | Do. |
| 3 | .210 | 80 | 106 | 8 | "Laid-on."[3] |
| 3 | .218 | 78 | 101 | 8 | Do. |
| 3 | .218 | 79 | 106 | 9 | Do. |
| 4 | .218 | 74 | 102 | 7 | Do. |
| 5 | .218 | 74 | 102 | 7 | Do. |
| 3 | .225 | 80 | 104 | 8 | Do. |

[1] At the body.
[2] Polymer-imbued bandage immersed in monomer and applied to body member by the "roll-on" method.
[3] Polymer-imbued bandage placed on monomer-saturated Polyfoam and applied to body member by the "laid-on" method.

The data shown in Table III shows that my orthopedic structures may be rapidly and safely made without forming an excessively high heat of reaction.

This application is a continuation-in-part of my co-pending application Serial No. 675,218, filed July 30, 1957, and now abandoned.

The phrase "body member" in the claims is intended to include assimilated and real body members or forms. The term "bandage" in the claims is intended to include material of any desired shape or construction that is suitable for the purposes of inventions herein disclosed and claimed.

The foregoing detailed description has been given for clearness of understanding only, and no unnecessary limitations should be understood therefrom, as modifications will be obvious to those skilled in the art.

I claim:

1. A method of preparing hard, rigid orthopedic structures for body members comprising: applying a barrier to a body member, impregnating a flexible bandage imbued with and having firmly affixed thereto a uniformly distributed, controlled amount of plasticized methacrylate polymer component having a polymerization catalyst with a controlled amount of a liquid, curable, methacrylate monomer component having a polymerization activator, and providing said impregnated bandage to said body member over said barrier to form an impregnated bandage having a monomer reaction system that rapidly and uniformly cures and intimately fuses with said polymer component at room temperature and forms a hard, rigid orthopedic structure of desired thickness and structural strength without necessitating the application of heat thereto and without producing an excessive temperature harmful to said body member.

2. The method of claim 1 wherein the barrier includes a protective barrier that shields the body member from the monomer component.

3. The method of claim 1 wherein the barrier includes a release agent that enables the impregnated, imbued bandage to be readily removed from the body member.

4. The method of claim 1 wherein said polymer component contains a major proportion of a lower alkyl methacrylate polymer, honey, and polymerization catalyst.

5. The method of claim 1 wherein said monomer reaction system includes lower alkyl methacrylate monomer, polymerization activator, and peroxidic catalyst.

6. The method of claim 1 wherein the monomer component has a reduced vapor pressure and is substantially free of the pungent odor normally associated with said component.

7. The method of claim 1 wherein the imbued bandage is impregnated with monomer component before the bandage is applied to the body member.

8. The method of claim 1 wherein the polymer component includes honey.

9. The hard, rigid orthopedic structure produced by the method of claim 1.

10. The method of claim 1 wherein said monomer reaction system rapidly and uniformly cures and intimately fuses with said polymer component within not more than about 12 minutes at room temperature to form a hard, rigid orthopedic structure.

11. The method of claim 1 wherein said monomer reaction system rapidly and uniformly cures and intimately fuses with said polymer component within not more than about 9 minutes at room temperature to form a hard, rigid orthopedic structure.

12. The hard, rigid orthopedic structure produced by the method of claim 1, wherein the monomer reaction system includes a lower alkyl methacrylate monomer, polymerization activator, lower alkyl methacrylate polymer, and polymerization catalyst.

13. A methacrylate polymer component containing, based on non-volatiles, about 63–88% by weight lower alkyl methacrylate polymer having about 0.3–5% by weight, based on the polymer, peroxidic catalyst, about 7–20% by weight honey, about 4–14% by weight secondary plasticizer, and about 0.4–10% by weight flow control agent.

14. An imbued bandage comprising a bandage imbued with a methacrylate polymer component containing about 63–88 parts by weight lower alkyl methacrylate polymer having about 0.3–5% by weight peroxidic catalyst, based on the polymer, and about 7–20 parts by weight honey.

15. The method of forming a curable roll of polymer-imbued bandage comprising: forming an impregnant of methacrylate polymer component containing, as non-volatiles, a major proportion of lower alkyl methacrylate polymer, plasticizer, and polymerization catalyst; imbuing a bandage with said impregnant to form a bandage having said polymer component affixed thereto; embossing said imbued bandage; applying a release agent to said imbued bandage; and immersing a roll of the bandage in a liquid, curable, methacrylate monomer component containing lower alkyl methacrylate monomer to provide a bandage that rapidly cures at room temperature to form a hard, rigid structure.

16. The method of forming a curable roll of embossed, polymer-imbued bandage comprising: forming an impregnant of methacrylate polymer component containing, as non-volatiles, a major proportion of lower alkyl methacrylate polymer, honey, and peroxidic polymerization catalyst; imbuing a bandage with said impregnant to form a bandage having said polymer component affixed thereto; embossing said imbued bandage; applying a release agent to said imbued bandage; and immersing a roll of the bandage in a liquid, curable, monomer component containing a lower alkyl methacrylate monomer and polymerization activator to provide a bandage that rapidly cures at room temperature to form a hard, rigid structure.

17. A roll of embossed, polymer-imbued bandage, said bandage being imbued with a methacrylate polymer component containing a lower alkyl methacrylate polymer, plasticizer, and polymerization catalyst.

18. A roll of embossed, polymer-imbued bandage, said bandage being imbued with a methacrylate polymer component containing a major proportion of lower alkyl methacrylate polymer, honey, and peroxidic polymerization catalyst.

19. A roll of embossed, polymer-imbued bandage, said bandage being imbued with a methacrylate polymer component containing a lower alkyl methacrylate polymer, plasticizer, and polymerization catalyst, said embossed, imbued bandage having a coating of a release agent.

20. A roll of embossed, polymer-imbued bandage, said bandage being imbued with a methacrylate polymer component containing a major proportion of lower alkyl methacrylate polymer, honey, and peroxidic polymerization catalyst, and having a coating of a release agent.

References Cited in the file of this patent

UNITED STATES PATENTS

| | | |
|---|---|---|
| 2,273,873 | Klein | Feb. 24, 1942 |
| 2,383,145 | Moose | Aug. 21, 1945 |
| 2,444,871 | Cohoe | July 6, 1948 |
| 2,489,252 | Anderson | Nov. 29, 1949 |
| 2,948,634 | Furendal | Aug. 9, 1960 |
| 2,960,984 | Parker | Nov. 22, 1960 |